United States Patent [19]
Heikkala

[11] 3,988,826

[45] Nov. 2, 1976

[54] TUBE SLITTER TOOL

[76] Inventor: Arvid E. Heikkala, 2523 N. Linden Ave., Waukegan, Ill. 60085

[22] Filed: Feb. 26, 1976

[21] Appl. No.: 661,656

[52] U.S. Cl. .................................. 30/90.4; 30/90.8; 30/90.9; 30/92.5

[51] Int. Cl.$^2$ .................. B21F 13/00; B23D 21/06; B26B 27/00

[58] Field of Search .................. 30/90.4, 90.8, 90.9, 30/92.5

[56] References Cited

UNITED STATES PATENTS

| | | | |
|---|---|---|---|
| 1,178,801 | 4/1916 | Griffin | 30/92.5 |
| 2,288,670 | 7/1942 | Babiary | 30/90.9 X |
| 2,346,227 | 4/1944 | Martin et al. | 30/90.9 |
| 2,374,753 | 5/1945 | Kramer | 30/90.9 |
| 2,385,368 | 9/1945 | Montgomery | 30/90.9 X |
| 2,388,698 | 11/1945 | Montgomery | 30/90.9 X |
| 2,457,540 | 12/1948 | Fasoldt | 30/90.9 |
| 2,538,453 | 1/1951 | Harkins | 30/92.5 X |
| 2,647,309 | 8/1953 | Chisena | 30/90.9 |
| 2,754,707 | 7/1956 | Hill | 30/90.8 |
| 3,043,004 | 7/1962 | Walter | 30/92.5 |

FOREIGN PATENTS OR APPLICATIONS

| | | | |
|---|---|---|---|
| 525,691 | 9/1940 | United Kingdom | 30/90.9 |
| 559,634 | 2/1944 | United Kingdom | 30/90.8 |

*Primary Examiner*—Al Lawrence Smith
*Assistant Examiner*—J. T. Zatarga
*Attorney, Agent, or Firm*—Hibben, Noyes & Bicknell, Ltd.

[57] ABSTRACT

A hand tool for slitting tubes longitudinally comprising a main tubular body section having an axial passage of uniform diameter provided at one end with a cutting blade which extends radially into the axial passage and at the opposite end with a roller guide member which extends into the axial passage for engagement with a tube in the passage to prevent relative rotary motion about a longitudinal axis between the tube and the body section of the tool. The main tubular body section is adapted to have removably secured in the axial passage thereof a tubular insert member which has an enlarged end section with a passage extending therethrough coaxial with the axial passage of the main body section and which is also provided with a roller guide member extending into the axial passage therein.

3 Claims, 6 Drawing Figures

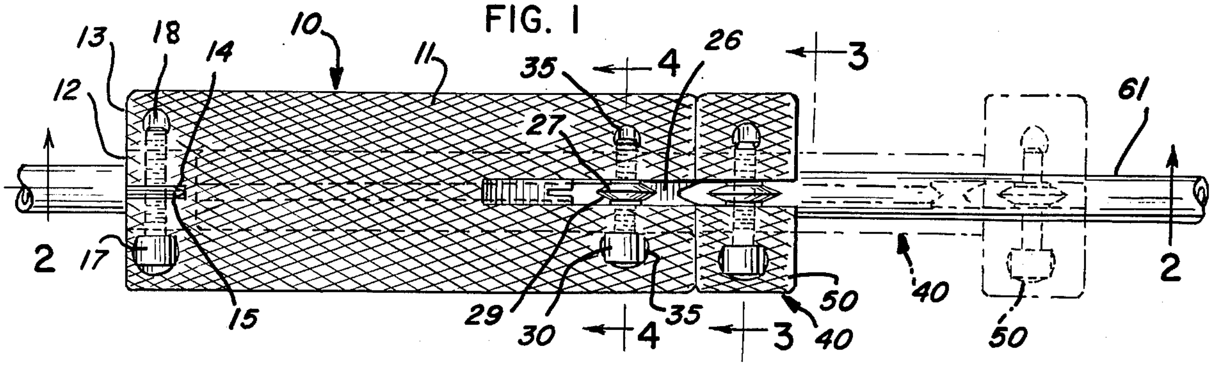
FIG. 1
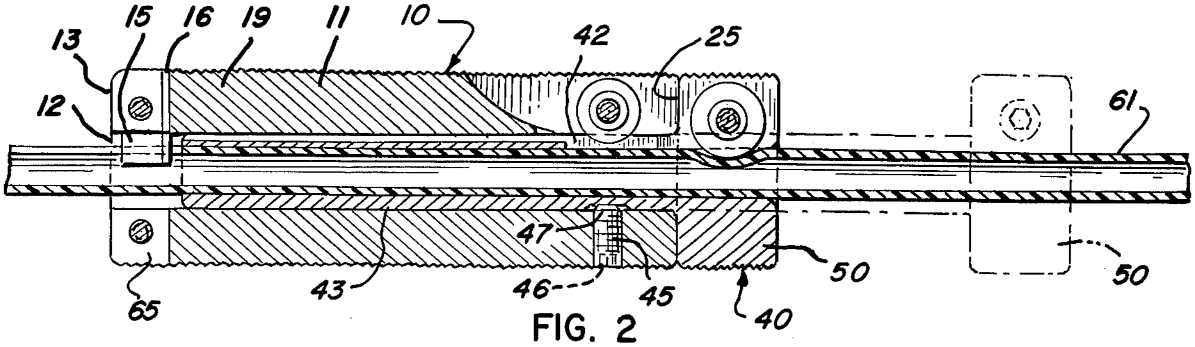
FIG. 2
FIG. 4
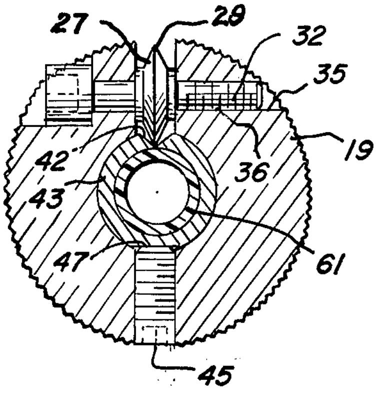
FIG. 3
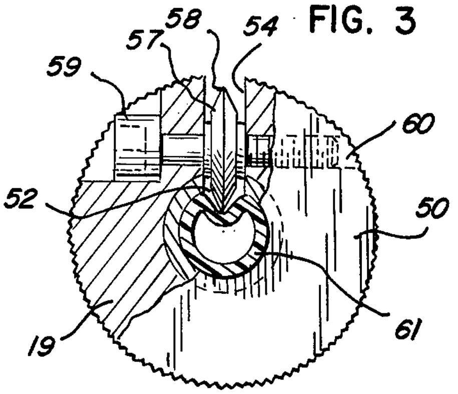
FIG. 5
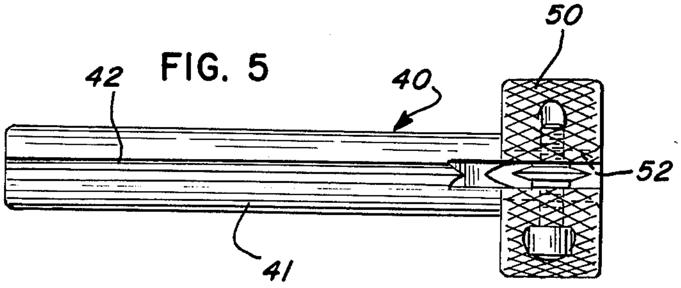
FIG. 6
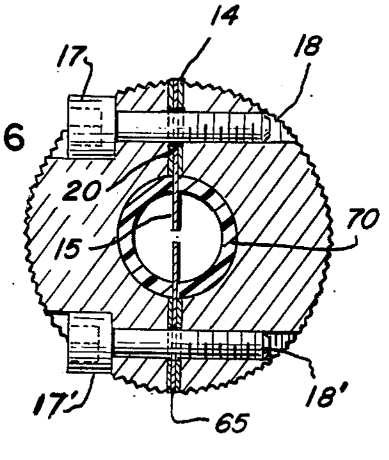

TUBE SLITTER TOOL

This invention relates generally to a tube slitting tool and more particularly to a hand operated tool for longitudinally slitting the wall section of a tubular article.

It is frequently necessary to gain access to the interior of a tube, such as a plastic, rubber or other thin walled tubular article during installation or salvaging operations. And, in some instances tubes of different diameters must be slit or without being able to pass the tube through a stationary tube slitting apparatus.

It is therefore an object of the present invention to provide a tube slitting tool for more conveniently slitting longitudinally tubes of different diameters.

It is a further object of the present invention to provide a tube slitting tube which can be moved longitudinally along a length of tube to effect slitting the tube in situ.

It is still another object of the present invention to provide a tube slitting tool which prevents the tube rotating about its longitudinal axis while the tube is being slit.

Other objects of the present invention will be apparent from the detailed description and claims to follow when read in conjunction with the accompanying drawing, wherein:

FIG. 1 is a top plan view with end section dotted in extended position;

FIG. 2 is a longitudinal vertical sectional view taken along the line 2—2 of FIG. 1;

FIG. 3 is a transverse vertical sectional view partially in elevation taken along the line 3—3 of FIG. 1;

FIG. 4 is a transverse vertical sectional view partially in elevation taken along the line 4—4 of FIG. 1;

FIG. 5 is a top plan view of the removable insert member of FIG 1; and

FIG. 6 is a transverse vertical sectional view through the tubular guide without the removable insert member and having a large diameter tubing therein.

The tube slitting tool 10 embodying the present invention is comprised of a tubular main body section 11 preferably with a knurled outer surface and having an axial passage 12 of uniform inner diameter extending the length thereof. Extending longitudinally inwardly a short distance from the end wall 13 of the body section 11 is a narrow radial slot 14 which extends through the tubular wall 19 of the body section 11. A cutting blade 15 is adapted to be mounted in the slot 14 with a bevelled cutting edge 16 facing the opposite end wall 25 of the body section 11 and extending radially inwardly a short distance into said axial passage and preferably not beyond the longitudinal axis of the body section 11. The blade 15 is held in position within the slot 14 by a clamping screw 17 mounted in a threaded opening 18 preferably extending through the body section 11 perpendicular to the plane of the slot 14 and a short distance above the longitudinal axis of the body section 11. A hole 20 is preferably formed in the blade 15 through which the screw 17 can pass and effectively clamp the blade 15 in the slot 14.

At the opposite end wall 25 of the body section 11 a radial slot 26 is cut through the tubular wall 19 of the body section 11 with the slot 26 extending longitudinally inwardly a short distance from the end wall 25 and having a width somewhat wider than the slot 14. A guide roller 27 having a thin peripheral edge portion 29 is freely rotatably mounted in the slot 26 on a pin 30 so that peripheral edge portion 29 of the roller 27 extends a short distance into the axial passage 12. The pin 30 is mounted in a passage 35 extending through the body section 11 perpendicular to the plane of the slot 26 and having the outer end 36 thereof threaded to form a secure engagement with the threaded end 32 of the pin 30.

The axial passage 12 of the main body section 11 is preferably adapted to slidably, removably receive therein a tubular guide sleeve insert member 40 which has a tubular guide sleeve section 41 with outer diameter only slightly smaller than the inner diameter of the passage 12 and a length less than the length of the body section 11 so that the tubular sleeve 40 does not contact the cutting blade 15 when the tubular sleeve 40 extends fully into the passage 12. The tubular guide sleeve section 41 is provided with a longitudinally extending groove 42 in the wall 43 thereof which is adapted to receive the edge portion 29 of the roller 27 and allows the tubular guide sleeve section 41 to be fully inserted into and seated in the passage 12 when the groove 42 is aligned with the roller 27. A set screw 45 is mounted in a threaded passage 46 extending upwardly through the body section 11 and is adapted to engage a flat 47 formed on the tubular guide sleeve section 41 to hold the sleeve section 41 fully seated within the passage 12.

The tubular guide sleeve member 40 has integrally formed with the outer end of the guide sleeve section 41 an enlarged head or cylindrical end section 50 which has an outer diameter the same as the outer diameter of the main body section 11. A longitudinal coaxial passage 52 extends through the cylindrical end section 50 with the passage 52 having an inner diameter identical to the inner diameter of the tubular guide sleeve section 41.

The outer ends of the passages 12 and 52 are preferably bevelled to facilitate insertion therein of a tubular member which is to be slit, as will be described hereinafter.

The enlarged end section 50 has a radial slot 54 extending therethrough with a guide roller 57 having a narrow tapered edge portion 58 freely rotatably mounted therein. The guide roller 57 is similar in form to the roller 27 but preferably has a slightly larger diameter. A pin 59 supports the roller 57 in the end section 50 so that the periphery of the roller 57 extends a short distance into the interior of the longitudinal passage 52. The pin 59 has the outer end thereof threaded for engagement in a threaded passage 60 in the end section 50.

When it is desired to slit a tube 61 having an outer diameter slightly smaller than the inner diameter than the roller guide sleeve member 40 one end of the tube 61 is inserted in the outwardly tapered end of the passage 52 whereupon the surface of the tube 61 is engaged by and deformed about the peripheral portion 58 of the roller 57 (see FIG. 3). The tube 61 is fed through the sleeve member 40 without the tube rotating about its longitudinal axis thereof into engagement with the cutting blade 15 and a longitudinal slit is formed in the wall of the tube 61 as the tube 61 is moved relative to the cutting blade 15 either by pulling the tube through the cutting tool 10 or moving the tool 10 longitudinally along the tube 61.

If a tube having an outer diameter larger than the inner diameter sleeve section 41 but smaller than the passage 12 is to be slit, the guide sleeve member 40 is separated from the body section 11 by loosening the set screw 45, and the guide sleeve member 40 with its enlarged end section 50 is withdrawn from the passage 12. The larger tube 70 which is to be slit is then inserted into the flared end of the passage 12, whereupon the tube is engaged by the roller 27 to prevent the tube rotating about its longitudinal axis as the tube passes through the passage 12. As the tube is moved past the cutting blade 15, a longitudinal slit is formed in the wall thereof.

Where it is desired to split the tube in half, a second cutting blade (see FIG. 6) similar to blade 15 can be mounted in the slot 65 formed in the body section preferably diametrically opposite the slot 14 and the second blade held by clamping screw 17' in threaded opening 18' identical to that used for holding blade 15. The larger tube is passed through the tool 10 in the above described manner. Also, while only one interfitting guide sleeve has been used in the embodiment illustrating the present invention, it should be understood that one or more additional guide sleeves can be mounted within the axial passage 12 with each guide sleeve being of slightly smaller diameter than the guide sleeve within which it is fitted and with each guide sleeve having an integral enlarged end section with a guide roller mounted therein as in the end section 50. In this manner the slitting tool is adapted to conveniently slit tubes of several different diameters.

I claim:

1. A tube slit tool comprising a tubular body section having an axial passage of uniform inner diameter, a cutting blade mounted adjacent one end of said axial passage and extending radially into said axial passage, a non-cutting guide roller having a tapered narrow edge portion which is freely rotatably mounted adjacent the opposite end of said axial passage, said edge portion of said guide roller extending radially into said axial passage for engaging and deforming the surface of a tube, which is passed longitudinally through said passage, about said edge such that a tube is slit longitudinally without allowing the tube to rotate relative to the longitudinal axis cylindrical body section while the tube is passed longitudinally through said tool.

2. A tube slitting tool as in claim 1, wherein said axial passage has a tubular guide sleeve member removably seated therein with the innermost end of said guide sleeve section being spaced from said cutting blade, said guide sleeve section having a groove extending longitudinally thereof which is adapted to receive therein the said edge portion of the said guide roller, which extends into said passage, said guide sleeve section having an enlarged end section integral therewith provided with a longitudinal passage having the same inner diameter as that of the guide sleeve section, and a second guide roller mounted adjacent the outer end of said enlarged end section with the peripheral portion thereof extending into the said longitudinal passage; whereby a tube having a diameter smaller than the first mentioned tube can be slit while said guide sleeve member is seated in said axial passage.

3. A tube slitting tool as in claim 1, wherein a second cutting blade is mounted in said body section adjacent said one end and spaced circumferentially from the first mentioned cutting blade.

* * * * *